(12) United States Patent
Kim et al.

(10) Patent No.: US 9,040,203 B2
(45) Date of Patent: May 26, 2015

(54) LITHIUM BATTERY

(71) Applicant: SAMSUNG SDI CO., LTD., Yongsin-si, Gyeonggi-do (KR)

(72) Inventors: Myung-Hoon Kim, Yongin-si (KR); Man-Seok Han, Yongin-si (KR); Seung-Wan Kim, Yongin-si (KR); Jung-Yeon Won, Yongin-si (KR); Ha-Na Yoo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 134 days.

(21) Appl. No.: 13/830,446

(22) Filed: Mar. 14, 2013

(65) Prior Publication Data
US 2014/0199602 A1    Jul. 17, 2014

Related U.S. Application Data

(60) Provisional application No. 61/753,400, filed on Jan. 16, 2013.

(51) Int. Cl.
| | |
|---|---|
| *H01M 6/16* | (2006.01) |
| *H01M 10/0569* | (2010.01) |
| *H01M 10/052* | (2010.01) |
| *H01M 10/0567* | (2010.01) |
| *H01M 4/38* | (2006.01) |
| *H01M 4/485* | (2010.01) |
| *H01M 4/525* | (2010.01) |

(52) U.S. Cl.
CPC ........ *H01M 10/0569* (2013.01); *H01M 10/052* (2013.01); *H01M 10/0567* (2013.01); *H01M 4/386* (2013.01); *H01M 4/485* (2013.01); *H01M 4/525* (2013.01); *H01M 2300/0034* (2013.01); *H01M 2300/004* (2013.01)

(58) Field of Classification Search
USPC .................................. 429/341, 231.95, 231.9
See application file for complete search history.

(56) References Cited

U.S. PATENT DOCUMENTS

| | | | |
|---|---|---|---|
| 5,916,708 A | 6/1999 | Besenhard et al. | |
| 6,652,605 B1 | 11/2003 | Bourbon et al. | |
| 7,235,334 B2 | 6/2007 | Kim et al. | |
| 2004/0038133 A1 | 2/2004 | Yamaguchi et al. | |
| 2006/0051673 A1 | 3/2006 | Johnson et al. | |

(Continued)

FOREIGN PATENT DOCUMENTS

| | | |
|---|---|---|
| EP | 0 807 986 A1 | 11/1997 |
| EP | 1 039 570 A1 | 9/2000 |

(Continued)

OTHER PUBLICATIONS

EPO Office action dated Jun. 24, 2014, for corresponding European Patent application 13177720.3, (11 pages).

(Continued)

*Primary Examiner* — Jane Rhee
(74) *Attorney, Agent, or Firm* — Christie, Parker & Hale, LLP

(57) ABSTRACT

A lithium battery including: a positive electrode including an overlithiated lithium transition metal oxide having a layered structure; a negative electrode including a silicon-based negative active material; and an electrolyte between the positive electrode and the negative electrode, the electrolyte including an electrolytic solution including a fluorinated ether solvent in an amount of 3 vol % or more based on the total volume of the electrolytic solution.

19 Claims, 3 Drawing Sheets

(56) References Cited

U.S. PATENT DOCUMENTS

| | | |
|---|---|---|
| 2008/0166637 A1 | 7/2008 | Inagaki et al. |
| 2009/0325076 A1 | 12/2009 | Matsui et al. |
| 2010/0124708 A1 | 5/2010 | Matsui et al. |
| 2011/0151336 A1 | 6/2011 | Lee et al. |
| 2013/0337338 A1 * | 12/2013 | Tikhonov et al. ............ 429/326 |

FOREIGN PATENT DOCUMENTS

| | | |
|---|---|---|
| EP | 2 312 684 A1 | 4/2011 |
| EP | 2 495 797 A1 | 9/2012 |
| JP | 07-249432 | 9/1995 |
| JP | 08-022839 | 1/1996 |
| JP | 08-037024 | 2/1996 |
| JP | 2004-342607 | 12/2004 |
| JP | 2007042393 A * | 2/2007 |
| JP | 2007-173113 | 7/2007 |
| JP | 2008-186803 A | 8/2008 |
| KR | 10-2005-0121172 | 12/2005 |
| KR | 10-2008-0061692 A | 7/2008 |
| WO | WO 2007/030297 A2 | 3/2007 |

OTHER PUBLICATIONS

Nakajima, T., et al, *Effect of addition of fluoroethers to organic solvents for lithium ion secondary batteries*, Journal of Fluorine Chemistry, vol. 111, No. 2, Oct. 28, 2001, pp. 167-174, XP004308458.

EPO Search Report dated Nov. 6, 2013, for corresponding European Patent application 13177720.3, (10 pages).

Patent Abstracts of Japan, and English machine translation of Japanese Publication 07-249432 dated Sep. 26, 1995, (14 pages).

Patent Abstracts of Japan, and English machine translation of Japanese Publication 08-037024 dated Feb. 6, 1996, (19 pages).

English Machine Translation for JP Patent Publication No. 2007-173113 dated Jul. 5, 2007, 28 pages.

English Machine Translation for JP Patent Publication No. 2004-342607 dated Dec. 2, 2004, 42 pages.

English Machine Translation for JP Patent No. 08-022839 dated Jan. 23, 1996, 21 pages.

\* cited by examiner

LITHIUM BATTERY

CROSS-REFERENCE TO RELATED APPLICATION

This application claims priority to and the benefit of U.S. Provisional Application No. 61/753,400, filed on Jan. 16, 2013 in the U.S. Patent and Trademark Office, the entire content of which is incorporated herein by reference.

BACKGROUND

1. Field

One or more embodiments of the present invention relates to a lithium battery.

2. Background

Lithium secondary batteries are used in portable electronic devices for mobile communication, such as personal digital assistants (PDAs) and mobile phones, as well as notebook computers, electric bicycles and electric vehicles. Lithium secondary batteries can have as much as twice the discharge voltage of a typical battery, and thus, lithium secondary batteries have high energy density.

Lithium secondary batteries produce electric energy due to oxidation and reduction reactions occurring when lithium ions are intercalated to or deintercalated from a positive electrode and a negative electrode. The positive electrode and negative electrode can each include an active material that enables the intercalation and deintercalation of lithium ions, and an organic electrolyte or a polymer electrolyte can be filled between the positive electrode and negative electrode.

For example, an oxide that consists of lithium and a transition metal and has a structure enabling intercalation of lithium ions may be used as a positive active material of a lithium secondary battery. Examples of such an oxide include lithium cobalt oxide ($LiCoO_2$), lithium nickel oxide ($LiNiO_2$), and lithium nickel cobalt manganese oxide ($Li[NiCoMn]O_2$, or $Li[Ni_{1-x-y}Co_xM_y]O_2$).

A carbonaceous material, such as an artificial and/or natural graphite or hard carbon, and a non-carbonaceous material, such as Si, which enable intercalation and deintercalation of lithium, may be used as a negative active material.

The requirement of a battery having high-capacity has resulted in the development of various electrode systems. As a way to achieve high capacity, for example, overlithiated lithium transition metal oxide having a layered structure can be used as a positive electrode, and a silicon-based negative active material can be used as a negative electrode. Such an electrode system requires an excellent electrolytic solution having excellent high voltage characteristics due to its operation at high voltage.

Most non-aqueous electrolytic solution solvents used in conventional lithium secondary batteries have a low withstanding voltage property. When an electrolytic solution including solvents having low withstanding voltage property is used in a lithium secondary battery, during repeated cycles of charging and discharging, the solvents decompose to generate gas, and thus, internal pressure of the battery increases and/or a product of the decomposition may cause a polymerization reaction or may attach to the surface of the battery.

Accordingly, there is a need to develop an electrolytic solution that is suitable for a high-capacity electrode system at high voltages.

SUMMARY

One or more aspects of embodiments of the present invention are directed toward a lithium battery having improved high capacity and cycle characteristics due to the presence of an electrolytic solution having excellent high voltage characteristics.

According to one or more embodiments of the present invention, a lithium battery includes: a positive electrode including an overlithiated lithium transition metal oxide having a layered structure; a negative electrode including a silicon-based negative active material; and an electrolyte between the positive electrode and the negative electrode, the electrolyte including an electrolytic solution including a fluorinated ether solvent in an amount of 3 vol % or more based on the total volume of the electrolytic solution.

The fluorinated ether solvent may include at least one compound represented by Formulae 4 to 6: [Formula 4] Rf1-O—Rf2; [Formula 5] Rf1-O—R; and [Formula 6] Rf1-O—(R'—O)$_n$—Rf$_2$, wherein Rf1 and Rf2 are each independently a linear or branched C1 to C12 fluoroalkyl group having at least one hydrogen atom substituted with a fluoro group, R is a linear or branched C1 to C12 alkyl group, R' is a linear or branched C1 to C5 alkylene group, and n is an integer of 1 to 5.

For example, Rf1 or Rf2 may each independently be a fluoroalkyl group, such as $HCF_2$—, $CF_3$—, $HCF_2CF_2$—, $CH_3CF_2$—, $CF_3CH_2$—, $CF_3CF_2$—, $(CF_3)_2CH$—, $HCF_2CF_2CH_2$—, $CF_3CH_2CH_2$—, $HCF_2CF_2CH_2$—, $HCF_2CF_2CF_2CF_2CH_2$—, $CF_3CF_2CH_2$—, $CF_3CFHCF_2CH_2$—, $HCF_2CF(CF_3)CH_2$—, or $CF_3CF_2CH_2CH_2$—.

In some embodiments, R is an alkyl group, such as —$CH_3$, —$C_2H_5$, —$C_3H_7$, or —$CH(CH_3)CH_3$.

For example, the fluorinated ether solvent may be $HCF_2CF_2CH_2OCF_2CF_2H$, $HCF_2CF_2CH_2OCF_2CH_3$, $CF_3CF_2CH_2OCF_2CF_2H$, $CF_3CF_2CH_2OCF_2H$, $HCF_2CF_2OCH_2CF_3$, $HCF_2CF_2CH_2OCF_2CFHCF_3$, $CF_3CF_2CH_2OCF_2CFHCF_3$, $HCF_2CF_2CH_2OCH_2CFHCF_3$, $CF_3CF_2CH_2OCH_2CFHCF_3$, $HCF_2CF_2CH_2OCH_3$, or a combination thereof.

The electrolytic solution may include the fluorinated ether solvent in an amount of about 3 to about 70 vol % based on the total volume of the electrolytic solution.

In some embodiments, the electrolytic solution includes the fluorinated ether solvent in an amount of about 10 vol % or more based on the total volume of the electrolytic solution.

In some embodiments, a volumetric ratio of the carbonate-based compound to the fluorinated ether solvent is in a range of 97:3 to 30:70. For example, a volumetric ratio of the carbonate-based compound to the fluorinated ether solvent may be in a range of 90:10 to 30:70. In some embodiments, a volumetric ratio of the carbonate-based compound to the fluorinated ether solvent is in a range of 90:10 to 70:30.

The electrolyte may further include an additive, such as tris(trimethylsilyl) phosphate (TMSPa), lithium difluorooxalatoborate (LiFOB), vinylcarbonate (VC), propanesultone (PS), succinitrile (SN), $LiBF_4$, a silane compound, a silazane compound, or a combination thereof.

In some embodiments, each of the silane compound and the silazane compound has a functional group capable of forming of a siloxane bond. For example, the functional group may be acryl, amino, epoxy, methoxy, or vinyl.

The electrolytic solution may include the additive in an amount in a range of about 0.01 to about 10 wt % based on the total weight of the electrolytic solution.

In some embodiments, the electrolytic solution further includes a carbonate-based compound, an ester-based compound, an ether-based compound, a ketone-based compound, an alcohol-based compound, an aprotic solvent, or a combination thereof.

The carbonate-based compound may include a chain carbonate compound and a fluoro carbonate compound.

The fluoro carbonate compound may be present in an amount from about 1 to about 30 vol % based on the total volume of the electrolytic solution.

The overlithiated transition metal oxide may include a compound represented by Formula 1: <Formula 1> $xLi_2MO_3\text{-}(1\text{-}x)LiM'O_2$, wherein $0<x<1$, M is at least one of Period 4 transition metals and Period 5 transition metals having a mean oxidation number of +4, and M' is at least one of Period 4 transition metals and Period 5 transition metals having a mean oxidation number of +3.

In some embodiments, the overlithiated transition metal oxide includes at least one compound represented by Formulae 2 to 5: <Formula 2> $xLi_2MnO_3\text{-}(1\text{-}x)LiNi_aCo_bMn_cO_2$, wherein $0<x<1$, $0<a\le1$, $0<b<1$, $0<c<1$, and $a+b+c=1$; <Formula 3> $xLi_2MO_3\text{-}yLiM'O_2\text{-}zLi_{1+d}M''_{2-d}O_4$, wherein $x+y+z=1$, $0<x<1$, $0<y<1$, $0<z<1$, and $0\le d\le0.33$, M is at least one of Period 4 transition metals and Period 5 transition metals having a mean oxidation number of +4, M' is at least one of Period 4 transition metals and Period 5 transition metals having a mean oxidation number of +3, and M" is at least one of Period 4 transition metals and Period 5 transition metals having a combined mean oxidation number of +3 or +4; <Formula 4> $Li[Li_xMe_y]O_{2+d}$, wherein $x+y=1$, $0<x<1$, $0\le d\le0.1$, and Me is at least one of Mn, V, Cr, Fe, Co, Ni, Zr, Re, Al, B, Ge, Ru, Sn, Ti, Nb, Mo, Pt or combinations thereof; and <Formula 5> $Li[Li_xNi_aCo_bMn_c]O_{2+d}$, wherein $x+a+b+c=1$, $0<x<1$, $0<a<1$, $0<b<1$, $0<c<1$, and $0\le d\le0.1$.

The silicon-based negative active material may include a material, such as Si, $SiO_x$ ($0<x<2$), Si—Z alloy, or combinations thereof, wherein Z is alkali metal, alkali earth metal, a Group 11 element, a Group 12 element, a Group 13 element, a Group 14 element, a Group 15 element, a Group 16 element, a transition metal, a rare earth element, or a combination thereof, and is not Si.

The silicon-based negative active material may have a nano-structure having a dimension of at least one region thereof being less than about 500 nm.

The nano-structure may be one of nanoparticle, nanopowder, nanowire, nanorod, nanofiber, nanocrystal, nanodot, nanoribbon or a combination thereof.

According to aspects of an embodiment of the present invention a lithium battery includes, as an electrolyte, a fluorinated ether solvent that provides oxidation stability at high voltages to increase a capacity retention ratio, charging and discharging characteristics, and a cycle lifespan of the lithium battery.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
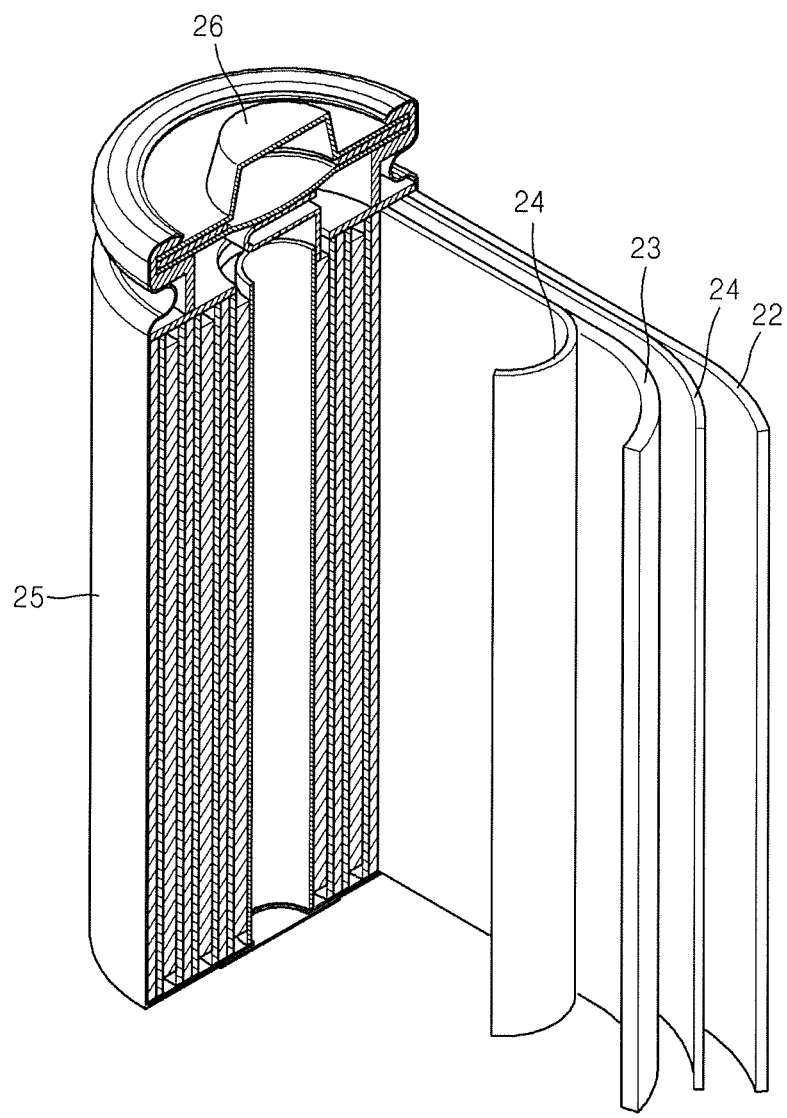
FIG. 1 is a schematic view of a lithium battery according to an embodiment of the present invention.

Hereinafter, embodiments of the present invention are described in more detail. In the following detailed description, only certain exemplary embodiments of the present invention are shown and described, by way of illustration. As those skilled in the art would recognize, the invention may be embodied in many different forms and should not be construed as being limited to the embodiments set forth herein. Also, in the context of the present application, when a first element is referred to as being "on" a second element, it can be directly on the second element or be indirectly on the second element with one or more intervening elements interposed therebetween. Like reference numerals designate like elements throughout the specification.

A lithium battery according to an embodiment of the present invention includes a positive electrode (e.g., a cathode) including an overlithiated lithium transition metal oxide having a layered structure; a negative electrode (e.g., an anode) including a silicon-based negative active material; and an electrolyte between the positive electrode and the negative electrode, the electrolyte including an electrolytic solution (e.g., a non-aqueous electrolytic solution) a fluorinated ether solvent (e.g., a fluoride-based ether solvent) in an amount of 3 vol % or more based on a total volume of the electrolytic solution.

According to an embodiment of the present invention, the overlithiated lithium transition metal oxide may include a compound represented by Formula 1 below.

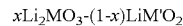

$$xLi_2MO_3\text{-}(1\text{-}x)LiM'O_2 \qquad \text{[Formula 1]}$$

Wherein $0<x<1$, M is at least one metal of Period 1 transition metals and Period 2 transition metals, having a mean oxidation number of +4, and M' is at least one metal of Period 1 transition metals and Period 2 transition metals, having a mean oxidation number of +3.

Herein, x is set based on one mole.

The overlithiated lithium transition metal oxide may contain an excess amount of Li in the transition metal layer of $LiM'O_2$, and the excess amount of Li may be included in the form of $Li_2MO_3$, which has high capacity and stability at high voltage, inside the layered structure of $LiM'O_2$. Accordingly, high capacity and structural stability of a composite positive active material may be obtained using the overlithiated transition metal oxide.

The lithium transition metal oxide may be a composite (e.g., a composite material) having a layered structure, or it may be a solid solution. In some cases, the lithium transition metal oxide may exist as a combination of the composite and the solid solution.

Regarding Formula 1, M may be for example, at least one metal of Mn, Ti, Zr, Sn, Mo or a combination thereof, M' may be, for example, at least one metal of Ni, Co, Mn, Fe, Al, Mg, Zn, Cu, Cr, V, Nb or a combination thereof.

For example, the lithium transition metal oxide may include a compound represented by Formula 2 below.

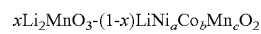

$$xLi_2MnO_3\text{-}(1\text{-}x)LiNi_aCo_bMn_cO_2 \qquad \text{[Formula 2]}$$

Wherein $0<x<1$, $0<a<1$, $0<b<1$, $0<c<1$, and $a+b+c=1$.

For example, the lithium transition metal oxide may include a compound represented by Formula 3 below.

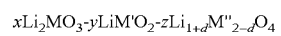

$$xLi_2MO_3\text{-}yLiM'O_2\text{-}zLi_{1+d}M''_{2-d}O_4 \qquad \text{[Formula 3]}$$

Wherein $x+y+z=1$; $0<x<1$, $0<y<1$, $0<z<1$, and $0\le d\le0.33$, M is at least one metal of Period 1 transition metals and Period 2 transition metals, having a mean oxidation number of +4, and M' is at least one metal of Period 1 transition metals and Period 2 transition metals, having a mean oxidation number of +3. M" is at least one metal of Period 1 transition metals and Period 2 transition metals, having a combination mean oxidation numbers of +3 and +4.

Regarding Formula 3, M may be, for example, at least one metal of Mn, Ti, Zr, Sn, Mo or a combination thereof, M' may be, for example, at least one metal of Ni, Co, Mn, Fe, Al, Mg, Zn, Cu, Cr, V, Nb or a combination thereof, and M" may be, for example, at least one metal of Ni, Co, Mn, Fe, Al, Mg, Zn, Cu, Cr, V, Nb or a combination thereof.

The positive electrode may instead include, as the overlithiated lithium transition metal oxide, in addition to the compounds described above, for example, a compound represented by Formula 4 or Formula 5 below:

$$Li[Li_xMe_y]O_{2+d}$$ [Formula 4]

Wherein x+y=1, 0<x<1, and 0≤d≤0.1, and Me is at least one metal of Mn, V, Cr, Fe, Co, Ni, Zr, Re, Al, B, Ge, Ru, Sn, Ti, Nb, Mo, Pt or a combination thereof.

$$Li[Li_xNi_aCo_bMn_c]O_{2+d}$$ [Formula 5]

Wherein x+a+b+c=1; 0<x<1, 0<a<1, 0<b<1, 0<c<1, and 0≤d≤0.1.

The overlithiated transition metal oxide may have a nanoparticle shape having a dimension of at least one region thereof being less than about 500 nm, for example, less than about 200 nm, less than about 100 nm, less than about 50 nm, or less than about 20 nm. The nanoparticle shape is suitable for providing high-rate discharging characteristics due to its contribution to an increase in the assembly density of the positive electrode plate. In addition, due to a decreased specific surface area, a reactivity thereof with the electrolytic solution decreases and thus, cycle characteristics may increase (or be improved).

The overlithiated transition metal oxide may form a primary particle. When primary particles agglomerate or are combined with each other, or when primary particles are combined with other active materials, secondary particles may be formed.

The negative electrode may include a silicon-based negative active material.

As used herein, the term "silicon-based" refers to a material including at least about 50 wt % of silicon (Si), for example, an inclusion of at least about 60 wt %, 70 wt %, 80 wt %, or 90 wt % Si, or 100 wt % of Si.

The silicon-based negative active material may be any one of various suitable materials that provide high capacity and are used in the art. Examples of the silicon-based negative active material include, for example, a material selected from the group consisting of Si, $SiO_x(0<x<2)$, Si—Z alloy (wherein Z is alkali metal, alkali earth metal, a Group 11 element, a Group 12 element, a Group 13 element, a Group 14 element, a Group 15 element, a Group 16 element, a transition metal, a rare earth element, or a combination thereof, and is not Si), and a combination thereof. The element Z may be selected from Mg, Ca, Sr, Ba, Ra, Sc, Y, La, Ti, Zr, Hf, V, Nb, Ta, Cr, Mo, W, Tc, Re, Fe, Ru, Os, Co, Rh, Ir, Ni, Pd, Pt, Cu, Ag, Au, Zn, Cd, B, Ge, P, As, Sb, Bi, S, Se, Te, Po, and a combination thereof. In addition, the silicon-based negative active material, such as Si, $SiO_x$, or Si—Z alloy, may be substantially crystalline (including mono-crystalline and poly-crystalline), non-crystalline, or a combination thereof.

The silicon-based negative active material may have a nano-structure having a dimension of at least one region thereof being less than about 500 nm, for example, less than about 200 nm, less than about 100 nm, less than about 50 nm, or less than about 20 nm. Examples of the nano-structure include nanoparticle, nanopowder, nanowire, nanorod, nanofiber, nanocrystal, nanodot, nanoribbon, and combinations thereof.

Such silicon-based negative active materials may be used alone, or in combination of two or more different kinds thereof.

An electrolyte may be between the positive electrode and the negative electrode.

In one embodiment, the electrolyte is a lithium salt-containing non-aqueous based electrolyte including, for example, a non-aqueous electrolytic solution and a lithium salt. To secure a withstanding voltage property and an oxidation-resistance stability in a high-capacity electrode system, the electrolyte may include a fluorinated ether solvent in an amount in a range of 3 to 60 vol % based on a total volume of the non-aqueous electrolytic solution.

An electrolytic solution including a typical carbonate-based solvent having a cyclic group or an alkyl group is unstable because it easily decomposes by oxidation at high voltage. However, according to embodiments of the present invention, the electrolyte including the fluorinated ether solvent having high oxidation-resistance property stability at high voltage may be suitable for a high-capacity electrode system that operates at high voltages. Accordingly, due to the oxidation-resistance property stability at high voltage, the electrolyte may contribute to an increase in a capacity retention ratio of a lithium battery, and may increase charging and discharging characteristics, thereby extending a cycle lifespan of the lithium battery.

The fluorinated ether solvent may include, for example, at least one of the compounds represented by Formulae 4 to 6 below.

$$Rf1-O-Rf2$$ [Formula 4]

Wherein Rf1 and Rf2 are each independently a linear or branched C1 to C12 fluoroalkyl group having at least one hydrogen atom substituted with a fluoro group.

$$Rf1-O-R$$ [Formula 5]

Wherein Rf1 is a linear or branched C1 to C12 fluoroalkyl group having at least one hydrogen atom substituted with a fluoro group, and R is a linear or branched C1 to C12 alkyl group.

$$Rf1-O-(R'-O)_n-Rf2$$ [Formula 6]

Wherein Rf1 and Rf2 are each independently a linear or branched C1 to C12 fluoroalkyl group having at least one hydrogen atom substituted with a fluoro group, and R' is a linear or branched C1 to C5 alkylene group, and n is an integer of 1 to 5.

Rf1 or Rf2 may be, for example, a fluoroalkyl group, such as $HCF_2-$, $CF_3-$, $HCF_2CF_2-$, $CH_3CF_2-$, $CF_3CH_2-$, $CF_3CF_2-$, $(CF_3)_2CH-$, $HCF_2CF_2CH_2-$, $CF_3CH_2CH_2-$, $HCF_2CF_2CF_2CH_2-$, $HCF_2CF_2CF_2CF_2CH_2-$, $CF_3CF_2CH_2-$, $CF_3CFHCF_2CH_2-$, $HCF_2CF(CF_3)CH_2-$, or $CF_3CF_2CH_2CH_2-$.

R may be, for example, an alkyl group, such as $-CH_3$, $-C_2H_5$, $-C_3H_7$, or $-CH(CH_3)CH_3$.

R' may be, for example, an alkylene group, such as $-CH_2-$, $-CH_2CH_2-$, or $-CH_2CH_2CH_2-$.

Examples of the fluoride-based ether solvent include $HCF_2CF_2CH_2OCF_2CF_2H$, $HCF_2CF_2CH_2OCF_2CH_3$, $CF_3CF_2CH_2OCF_2CF_2H$, $CF_3CF_2CH_2OCF_2H$, $HCF_2CF_2OCH_2CF_3$, $HCF_2CF_2CH_2OCF_2CFHCF_3$, $CF_3CF_2CH_2OCF_2CFHCF_3$, $HCF_2CF_2CH_2OCH_2CFHCF_3$, $CF_3CF_2CH_2OCH_2CFHCF_3$, and $HCF_2CF_2CH_2OCH_3$. From among the fluorinated ether solvents, $HCF_2CF_2CH_2OCF_2CF_2H$, $HCF_2CF_2CH_2OCF_2CH_3$, $CF_3CF_2CH_2OCF_2H$, $HCF_2CF_2OCH_2CF_3$, and/or HCF$_2$CF$_2$CH$_2$OCH$_3$ may be used in consideration of their compatibility with other solvents and excellent rate characteristics.

The fluorinated ether solvents may be used alone, or in combination of two or more different kinds of these materials.

The electrolyte may include the fluorinated ether solvent in an amount of 3 vol % or more based on a total volume of the non-aqueous electrolytic solution. For example, the fluorinated ether solvent may be 10 vol % or more, 20 vol % or more, or 30 vol % or more, based on the total volume of the non-aqueous electrolytic solution. For example, the amount of the fluorinated ether solvent may be, based on the total volume of the non-aqueous electrolytic solution, in a range of about 3 to about 70 vol %, about 10 to about 70 vol %, about 10 to about 60 vol %, or about 10 to about 30 vol %. When the amount of the fluorinated ether solvent is less than 3 vol %, a withstanding voltage property may decrease, and thus, an electrolytic solution may be oxidized at high voltage, and thus, a discharge capacity retention ratio of a lithium battery including the electrolytic solution may substantially decrease.

In addition, the electrolyte may further include an additive to form a stabilized solid electrolyte interface (SEI) on the surface of an electrode to prevent a reaction between the electrode and the electrolytic solution.

The additive may be, for example, tris(trimethylsilyl) phosphate (TMSPa), lithium difluorooxalatoborate (LiFOB), vinylcarbonate (VC), propanesultone (PS), succinitrile (SN), LiBF$_4$, a silane compound, a silazane compound such as hexamethyldisilazane, or the like. The silane compound and the silazane compound may each have a functional group capable of forming a siloxane bond. Examples of such a functional group include acryl, amino, epoxy, methoxy, vinyl, and the like. The additive may be used alone, or in combination of two or more different additives.

The additive may be included in an amount in a range of about 0.01 to about 10 wt % based on a total weight of the electrolytic solution to form a stable SEI film. For example, the additive may be included in an amount in a range of about 0.05 to about 10 wt %, about 0.1 to about 5 wt %, or about 0.5 to about 4 wt %, based on the total weight of the electrolytic solution to form a stable SEI film. The amount of the additive may be outside of the foregoing ranges as long as the inclusion of the additive does not cause a decrease in the amount of the increase of the capacity retention ratio of the lithium battery that results from the inclusion of the electrolyte.

The non-aqueous electrolytic solution used in the electrolyte may act as a medium through which ions participating in an electrochemical reaction of the battery move.

The non-aqueous electrolytic solution may include a carbonate-based compound, an ester-based compound, an ether-based compound, a ketone-based compound, an alcohol-based compound, an aprotic solvent, or a combination thereof.

The carbonate-based compound may be a chain carbonate compound, a cyclic carbonate compound, a fluoro carbonate compound, or a combination thereof.

The chain carbonate compound may be, for example, diethyl carbonate (DEC), dimethyl carbonate (DMC), dipropyl carbonate (DPC), methylpropyl carbonate (MPC), ethylpropylcarbonate (EPC), methylethyl carbonate (MEC), or a combination thereof, and the cyclic carbonate compound may be, for example, ethylene carbonate (EC), propylenecarbonate (PC), butylene carbonate (BC), vinylethylene carbonate (VEC) or a combination thereof.

The fluoro carbonate compound may be, for example, fluoroethylene carbonate (FEC), 4,5-difluoroethylenecarbonate, 4,4-difluoroethylenecarbonate, 4,4,5-trifluoroethylenecarbonate, 4,4,5,5-tetrafluoroethylenecarbonate, 4-fluoro-5-methylethylenecarbonate, 4-fluoro-4-methylethylenecarbonate, 4,5-difluoro-4-methylethylenecarbonate, 4,4,5-trifluoro-5-methylethylenecarbonate, trifluoromethylethylenecarbonate, or a combination thereof.

The carbonate-based compound may also be a combination of chain carbonate compounds, cyclic carbonate compounds, and/or fluoro carbonate compounds. The fluoro carbonate compound may increase solubility of a lithium salt to increase ionic conductivity, and it may aid in the formation of a film on the negative electrode including the silicon-based negative active material. The fluoro carbonate compound may be present in an amount of 1 to 30 vol % of the total volume of the non-aqueous electrolytic solution. Within the range described above, desired (e.g., suitable) effects may be obtained while a viscosity of the electrolyte may be maintained at an appropriate (e.g., suitable) level.

The ester-based compound may be methylacetate, acetate, n-propylacetate, dimethylacetate, methylpropionate, ethylpropionate, γ-butyrolactone, decanolide, valerolactone, mevalonolactone, or caprolactone. The ether-based compound may be dibutyl ether, tetraglyme, diglyme, dimethoxyethane, 2-methyltetrahydrofurane, or tetrahydrofuran, and the ketone-based compound may be cyclohexanone. In addition, the alcohol-based compound may be ethylalcohol or isopropyl alcohol.

The aprotic solvent may be dimethylsulfoxide, 1,2-dioxolane, sulforane, methyl sulforane, 1,3-dimethyl-2-imidazolidinone, N-methyl-2-pyrrolidinone, formamide, dimethylformamide, acetonitrile, nitromethane, trimethyl phosphate, triethyl phosphate, trioctyl phosphate, or triester phosphate.

The non-aqueous electrolytic solution may be used alone, or in combination of two or more different kinds thereof, and in the latter case, a mixed ratio (e.g., a mixing ratio) may vary according to desired (e.g., suitable) performance of a battery.

A lithium salt included in the electrolyte may act as a supplier of lithium ions in a battery, enabling operation of the lithium battery. The lithium salt may be any one of various suitable materials that are used in lithium batteries. For example, a material that is easily dissolved in a non-aqueous based electrolyte may be used as the lithium salt, and examples of such a material include LiCl, LiBr, LiI, LiClO$_4$, LiB$_{10}$Cl$_{10}$, LiPF$_6$, CF$_3$SO$_3$Li, CH$_3$SO$_3$Li, C$_4$F$_3$SO$_3$Li, (CF$_3$SO$_2$)$_2$NLi, LiN(C$_x$F$_{2x+1}$SO$_2$)(C$_y$F$_{2+y}$SO$_2$) (wherein x and y are natural numbers), CF$_3$CO$_2$Li, LiAsF$_6$, LiSbF$_6$, LiAlCl$_4$, LiAlF$_4$, lithiumchloroborate, low aliphatic lithium carbonate, 4 phenyl lithium borate, lithium imide, and a combination thereof.

The lithium salt may be used in a concentration in a range of, for example, about 0.1M to about 2.0M to secure practical (e.g., suitable) performance of a lithium battery. When the concentration of a lithium salt is within the foregoing range, the electrolyte may have appropriate (e.g., suitable) levels of conductivity and viscosity and thus excellent electrolyte performance may be obtained and also, lithium ions may effectively move through the electrolyte.

A lithium battery with such a structure may be manufactured by using a typical method, and the method is not described in more detail herein.

FIG. 1 is a schematic view of a secondary lithium battery 30 according to an embodiment of the present invention.

Referring to FIG. 1, the lithium battery 30 includes a positive electrode 23, a negative electrode 22, and a separator 24 disposed between the positive electrode 23 and the negative electrode 22. The positive electrode 23, the negative electrode 22, and the separator 24 are wound or folded to be placed in a battery case 25. Subsequently, an electrolyte is injected into the battery case 25 and the resultant structure is sealed with a sealing member 26, thereby completing the manufacturing of the lithium battery 30. The battery case 25 may be a cylindrical, rectangular, or thin-film shape. The lithium battery may be a lithium ion battery.

The positive electrode 23 may include a positive electrode current collector and a positive active material layer on the positive electrode current collector.

The positive electrode current collector may have a thickness in a range of about 3 to about 500 μm. The positive current collector may not be particularly limited as long as it does not cause any undesirable chemical change in a secondary battery and has conductivity. Examples of a material for the positive current collector include copper, stainless steel, aluminum, nickel, titanium, calcined carbon, and copper or stainless steel that is surface-treated with carbon, nickel, titanium, silver, and an aluminum-cadmium alloy. In addition, the positive current collector may have a fine uneven structure at its surface to increase a binding force with respect to the positive active material, and the positive current collector may have various shapes, such as film, sheet, foil, net, porosity, foam, or non-woven shape.

The positive active material layer may include a positive active material, a binder, and selectively a conducting agent.

The positive active material may include an overlithiated lithium transition metal oxide with the layered structure described above.

The positive active material layer may further include other typical positive active materials in addition to the overlithiated lithium transition metal oxide.

The positive active material may include any one of various suitable lithium-containing metal oxides that are typically used in the art. For example, at least one composite oxide of lithium and metal selected from cobalt, manganese, nickel, and a combination thereof may be used, and detailed examples thereof include compounds represented by: $Li_aA_{1-b}B_bD_2$ (wherein, $0.90 \leq a \leq 1$, and $0 \leq b \leq 0.5$); $Li_aE_{1-b}B_bO_{2-c}D_c$ (wherein, $0.90 \leq a \leq 1$, $0 \leq b \leq 0.5$, $0 \leq c \leq 0.05$); $LiE_{2-b}B_bO_{4-c}D_c$ (wherein, $0 \leq b \leq 0.5$, and $0 \leq c \leq 0.05$); $Li_aNi_{1-b-c}Co_bB_cD_\alpha$ (wherein, $0.90 \leq a \leq 1$, $0 \leq b \leq 0.5$, $0 \leq c \leq 0.05$, and $0 < \alpha \leq 2$); $Li_aNi_{1-b-c}Co_bB_cO_{2-\alpha}F_\alpha$ (wherein, $0.90 \leq a \leq 1$, $0 \leq b \leq 0.5$, $0 \leq c \leq 0.05$, and $0 < \alpha < 2$); $Li_aNi_{1-b-c}Co_bB_cO_{2-\alpha}F_2$ (wherein, $0.90 \leq a \leq 1$, $0 \leq b \leq 0.5$, $0 \leq c \leq 0.05$, and $0 < \alpha < 2$); $Li_aNi_{1-b-c}Mn_bB_cD_\alpha$ (wherein, $0.90 \leq a \leq 1$, $0 \leq b \leq 0.5$, $0 \leq c \leq 0.05$, and $0 < \alpha \leq 2$); $Li_aNi_{1-b-c}Mn_bB_cO_{2-\alpha}F_\alpha$ (wherein, $0.90 \leq a \leq 1$, $0 \leq b \leq 0.5$, $0 \leq c \leq 0.05$, and $0 < \alpha < 2$); $Li_aNi_{1-b-c}Mn_bB_cO_{2-\alpha}F_2$ (wherein, $0.90 \leq a \leq 1$, $0 \leq b \leq 0.5$, $0 \leq c \leq 0.05$, and $0 < \alpha < 2$); $Li_aNi_bE_cG_dO_2$ (wherein, $0.90 \leq a \leq 1$, $0 \leq b \leq 0.9$, $0 \leq c \leq 0.5$, and $0.001 \leq d \leq 0.1$); $Li_aNi_bCo_cMn_dGeO_2$ (wherein, $0.90 \leq a \leq 1$, $0 \leq b \leq 0.9$, $0 \leq c \leq 0.5$, and $0 \leq d \leq 0.5$, $0.001 \leq e \leq 0.1$); $Li_aNiG_bO_2$ (wherein, $0.90 \leq a \leq 1$, $0.001 \leq b \leq 0.1$.); $Li_aCoG_bO_2$ (wherein, $0.90 \leq a \leq 1$, $0.001 \leq b \leq 0.1$); $Li_aMnG_bO_2$ (wherein, $0.90 \leq a \leq 1$, and $0.001 \leq b \leq 0.1$); $Li_aMn_2G_bO_4$ (wherein, $0.90 \leq a \leq 1$, and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the formulae above, A is Ni, Co, Mn, or a combination thereof; B is Al, Ni, Co, Mn, Cr, Fe, Mg, Sr, V, a rare-earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

For example, $LiCoO_2$, $LiMn_xO_{2x}$ (x=1, 2), $LiNi_{1-x}Mn_xO_{2x}$ ($0 \leq x \leq 1$), $LiNi_{1-x-y}Co_xMn_yO_2$ ($0 \leq x \leq 0.5$, $0 \leq y \leq 0.5$), or $FePO_4$ may be used in the positive active material.

When used in the positive active material, the foregoing compounds may have a coating layer on their surfaces, or these compounds may be mixed with a compound having a coating layer. The coating layer may include an oxide of a coating element, a hydroxide of the coating element, an oxyhydroxide of the coating element, an oxycarbonate of the coating element, or a hydroxycarbonate of the coating element. The compounds that form the coating layer may be amorphous or crystalline.

As a coating element included in the coating layer, Mg, Al, Co, K, Na, Ca, Si, Ti, V, Sn, Ge, Ga, B, As, Zr, or a mixture thereof may be used. The coating layer may be formed by using any one of various suitable coating methods that are performed using the compounds and the elements and do not affect properties of the positive active material (For example, spray coating, immersion, or the like). These coating methods should be apparent to one of ordinary skill in the art and thus, are not described in more detail herein.

The binder may be any one of various suitable materials that enable positive active material particles to attach to each other and that enable the positive active material to attach to the positive current collector. Examples thereof include polyvinylalcohol, carboxymethylcellulose, hydroxypropylcellulose, diacetylcellulose, polyvinylchloride, carboxylated polyvinylchloride, polyvinylfluoride, ethylene oxide-containing polymer, polyvinylpyrrolidone, polyurethane, polytetrafluoroethylene, polyvinylidene fluoride, polyethylene, polypropylene, styrene-butadiene rubber, acrylated styrene-butadiene rubber, epoxy resin, and nylon.

The conducting agent is used to provide conductivity to an electrode, and may be any one of various suitable electrically conductive materials that do not cause any undesirable chemical changes in the battery. Examples thereof include natural graphite, artificial graphite, carbon black, acetylene black, ketjen black, carbon fiber, and metal powder or fiber of copper, nickel, aluminum, or silver.

The negative electrode 22 may include a negative electrode current collector and a negative active material layer formed on the positive electrode current collector.

The negative electrode current collector may have a thickness in a range of about 3 to about 500 μm. The negative current collector may not be particularly limited as long as it does not cause any undesirable chemical change in a secondary battery and has conductivity, and examples of a material for forming the negative current collector include copper, stainless steel, aluminum, nickel, titanium, calcined carbon, and copper or stainless steel that is surface treated with carbon, nickel, titanium, silver, and an aluminum-cadmium alloy. In addition, the negative current collect may have a fine uneven structure to increase a binding force with respect to an electrode active material, and the negative current collector may have various shapes, such as film, sheet, foil, net, porosity, foam, or non-woven shape.

The negative active material layer may include a negative active material, a binder, and selectively a conducting agent.

The negative active material may include the silicon-based negative active material described above.

The negative active material layer may additionally include, in addition to the silicon-based negative active material, other typical negative active materials.

The negative active material may be any one of various suitable lithium-containing metal oxides that are typically used in the art. For example, lithium metal, lithium-alloyable metal, a transition metal oxide, a lithium-dopable and undopable material, or a material that enables reversible intercalation and deintercalation of lithium ions may be used, and two or more different kinds of these materials may be used in a mixed or combined form.

As an alloy of the lithium metal, an alloy of lithium and a metal of Na, K, Rb, Cs, Fr, Be, Mg, Ca, Sr, Si, Sb, Pb, In, Zn, Ba, Ra, Ge, Al, or Sn may be used.

Nonlimiting examples of the transition metal oxide include tungsten oxide, molybdenum oxide, titanium oxide, lithium titanium oxide, vanadium oxide, and lithium vanadium oxide.

The lithium-dopable and undopable material may be, for example, Sn, $SnO_2$, or a Sn—Y alloy (wherein Y is an alkali metal, alkali earth metal, Group 11 element, Group 12 element, Group 13 element, Group 14 element, Group 15 element, Group 16 element, transition metal, rare earth element or a combination thereof, and is not Sn). The element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The material that enables reversible intercalation and deintercalation of lithium ions may be any one of various suitable carbonaceous materials that are typically used as a carbonaceous negative active material in a lithium battery. For example, a crystalline carbon, amorphous carbon, or a mixture thereof may be used. The crystalline carbon may be natural graphite, artificial graphite, expandable graphite, graphene, fullerene soot, carbon nanotube, or carbon fiber, but is not limited thereto. The amorphous carbon may be soft carbon (low temperature calcined carbon), hard carbon, mesophase pitch carbide, or calcined corks, but is not limited thereto. The carbon-based negative active material may be spherical, tabular, fibrous, tube-shapes, or powder.

The binder may be any one of various suitable materials that enable negative active material particles to attach to each other and that enable the negative active material to attach to a current collector. Examples thereof include polyvinylalcohol, carboxymethylcellulose, hydroxypropylcellulose, polyvinylchloride, carboxylated polyvinyl chloride, polyvinyl fluoride, ethylene oxide-containing polymer, polyvinylpyrrolidone, polyurethane, polytetrafluoroethylene, polyvinylidene fluoride, polyethylene, polypropylene, styrene-butadiene rubber, acrylated styrene-butadiene rubber, epoxy resin, and nylon.

The conducting agent is used to provide conductivity to an electrode, and may be any one of various suitable electrically conductive materials that do not cause any undesirable chemical changes in the battery. Examples thereof include: a carbonaceous material, such as natural graphite, artificial graphite, carbon black, acetylene black, ketjen black, carbon fiber; metal powder or fiber of copper, nickel, aluminum, or silver; and a conducting polymer, such as polyphenylene derivative; or a mixture thereof.

In one embodiment, each of the positive electrode 23 and the negative electrode 22 is manufactured by mixing an active material, a conducting agent, and a binder in a solvent to prepare an active material composition and doping the composition on a current collector.

This manufacturing method is well known in the art, and thus, a more detailed description thereof will be omitted herein. The solvent may be N-methylpyrrolidone (NMP), acetone, water, or the like, and is not limited thereto.

The positive electrode 23 and the negative electrode 22 may be separated by the separator 24, and the separator 24 may be any one of various suitable materials that are typically used in a lithium battery. For example, a material that has low resistance to ion migration of an electrolyte and has excellent electrolytic solution retaining capability is suitable as a material for forming the separator. For example, the separator 24 may be a single-layered film or a multi-layered film, and a material for forming the separator may be selected from glass fiber, polyester, Teflon, polyethylene, polypropylene, polytetrafluoroethylene (PTFE), and a combination thereof, each of which may be in a non-woven fabric or woven fabric form. The separator may have a pore size in a range of about 0.01 to about 10 μm, and a thickness in a range of about 3 to about 100 μm.

The electrolyte may be a lithium salt-containing non-aqueous based electrolyte that includes a fluorinated ether solvent (e.g., a fluoride-based ether solvent) in a relative amount with respect to the total volume of the non-aqueous electrolytic solution.

The lithium battery may be suitable for, in addition to mobile phones and portable computers, applications requiring high capacity, high performance, and high-temperature driving, such as electric vehicles. In addition, the lithium battery may be combined with a typical internal combustion engine, a fuel battery, or a super capacitor for use in hybrid vehicles. In addition, the lithium battery may be used in other various applications that require high output, high voltage, and high-temperature driving. Such applications are electric vehicles, machine tools, etc Embodiments of the present invention are further described in more detail with respect to Examples and Comparative Examples. However, the Examples are presented herein for illustrative purposes only.

EXAMPLE 1

A composite positive active material powder having a composition of $0.45LiNi_{0.5}Co_{0.2}Mn_{0.3}O_2$-$0.55Li_2MnO_3$, which is a positive active material, and a carbon conducting agent (Super-P; Timcal Ltd.) were uniformly mixed at a weight ratio of 90:5, and then, a polyvinylidene fluoride (PVDF) binder solution was added thereto to prepare an active material slurry having a weight ratio of 90:5:5 of active material: carbon conducting agent:binder. The active material slurry was coated on an aluminum foil to a thickness of 15 μm, and then dried and pressed, thereby completing the manufacturing of a positive electrode.

A Si—Ti—Ni-based Si-alloy (an atomic ratio of Si:Ti:Ni was 68:16:16, and an average particle size thereof was 5 μm), which is a negative active material, LSR7 (manufacturer: Hitachi Chemical, a binder including PAI 23 wt %, and N-methyl-2-pyrrolidone 97 wt %), which is a binder, and Ketjen Black, which is a conducting agent, were mixed at a mixed ratio of 84:4:8, and then, N-methylpyrrolidone was added to the mixture to control a viscosity thereof to make a solid content to be 60 wt %, thereby preparing a negative active material slurry. The negative active material slurry was coated on a copper foil current collector to a thickness of 10 μm, and then, dried and pressed, thereby completing the manufacturing a negative electrode.

As a separator, a 20 μm-thick polyethylene film coated with an inorganic and organic material of PVDF and $Mg(OH)_2$ at a weight ratio of 40:60 was used. The positive electrode, the negative electrode, and the separator were used, and an electrolyte was injected thereto to manufacture a lithium battery. In this regard, the electrolyte was prepared as follows: fluoroethylene carbonate, dimethylcarbonate, and 2,2,3,3-tetrafluoropropyl-1,1,2,2-tetrafluoroethyl ether, which is a fluoro ether solvent (e.g., a fluorinated ether solvent), were mixed at a volumetric ratio of 25:72:3 to prepare a mixed solvent, and then, $LiPF_6$ was added to the mixed solvent until a concentration thereof was 1.3M, and tris trimethylsilyl phosphate was added thereto in an amount of 2 wt % based on a total weight of the electrolyte.

EXAMPLE 2

A lithium battery was manufactured in the same manner as in Example 1, except that a mixed ratio of fluoro ethylene carbonate, dimethylcarbonate, and fluoro ether (e.g., fluorinated ether solvent) in the electrolyte was 25:65:10.

EXAMPLE 3

A lithium battery was manufactured in the same manner as in Example 1, except that a mixed ratio of fluoro ethylene carbonate, dimethylcarbonate, and fluoro ether (e.g., fluorinated ether solvent) in the electrolyte was 25:45:30.

EXAMPLE 4

A lithium battery was manufactured in the same manner as in Example 1, except that a mixed ratio of fluoro ethylene carbonate, dimethylcarbonate, and fluoro ether (e.g., fluorinated ether solvent) in the electrolyte was 25:15:60.

EXAMPLE 5

A lithium battery was manufactured in the same manner as in Example 1, except that a mixed ratio of fluoro ethylene carbonate, dimethylcarbonate, and fluoro ether (e.g., fluorinated ether solvent) in the electrolyte was 25:5:70.

EXAMPLE 6

A lithium battery was manufactured in the same manner as in Example 3, except that a mixed ratio of fluoro ethylene carbonate, dimethylcarbonate, and fluoro ether (e.g., fluorinated ether solvent) in the electrolyte was 25:55:20, and tris trimethylsilyl phosphate was not used.

EXAMPLE 7

A lithium battery was manufactured in the same manner as in Example 1, except that a mixed ratio of fluoro ethylene carbonate, dimethylcarbonate, and fluoro ether (e.g., fluorinated ether solvent) in the electrolyte was 25:45:30, and tris trimethylsilyl phosphate was not used.

EXAMPLE 8

A lithium battery was manufactured in the same manner as in Example 3, except that 2.0 wt % of lithium difluorooxalatoborate (LiFOB) was further added to the electrolyte based on the total weight of the electrolytic solution.

EXAMPLE 9

A lithium battery was manufactured in the same manner as in Example 3, except that 2.0 wt % of vinylcarbonate (VC) was further added to the electrolyte based on the total weight of the electrolytic solution.

EXAMPLE 10

A lithium battery was manufactured in the same manner as in Example 3, except that 2.0 wt % of propanesultone (PS) was further added to the electrolyte based on the total weight of the electrolytic solution.

EXAMPLE 11

A lithium battery was manufactured in the same manner as in Example 3, except that 2.0 wt % of succinonitrile (SN) was further added to the electrolyte based on the total weight of the electrolytic solution.

EXAMPLE 12

A lithium battery was manufactured in the same manner as in Example 3, except that 0.5 wt % of $LiBF_4$ was further added to the electrolyte based on the total weight of the electrolytic solution.

EXAMPLE 13

A lithium battery was manufactured in the same manner as in Example 3, except that 2.0 wt % of hexamethyldisilazane was further added to the electrolyte based on the total weight of the electrolytic solution.

EXAMPLE 14

A lithium battery was manufactured in the same manner as in Example 3, except that 0.5 wt % of $LiBF_4$, 2 wt % of propansultone (PS), and 1 wt % of succinonitrile (SN) were further added to the electrolyte based on the total weight of the electrolytic solution.

COMPARATIVE EXAMPLE 1

A lithium battery was manufactured in the same manner as in Example 1, except that fluoro ether (e.g., fluorinated ether solvent) was not used, and fluoro ethylene carbonate and dimethylcarbonate were mixed at a mixed ratio of 25:75 to prepare a mixed solvent, and tris trimethylsilyl phosphate was not added.

EVALUATION EXAMPLE 5

Evaluation of Battery Characteristics

Lifespan characteristics of the batteries manufactured according to Examples 1-14 and Comparative Example 1 were evaluated.

Charging and discharging tests were performed at room temperature of 25° C., and an initial formation efficiency was evaluated at 0.1 C charging/0.1 C discharging, and lifespan characteristics were evaluated by repeating a cycle of 1 C charging/1 C discharging 200 times. Lifespan characteristics are calculated as a capacity retention ratio defined by Equation 1 below.

Capacity retention ratio[%]=[discharge capacity at each cycle/discharge capacity in a first cycle]× 100 <Equation 1>

Figure 2:
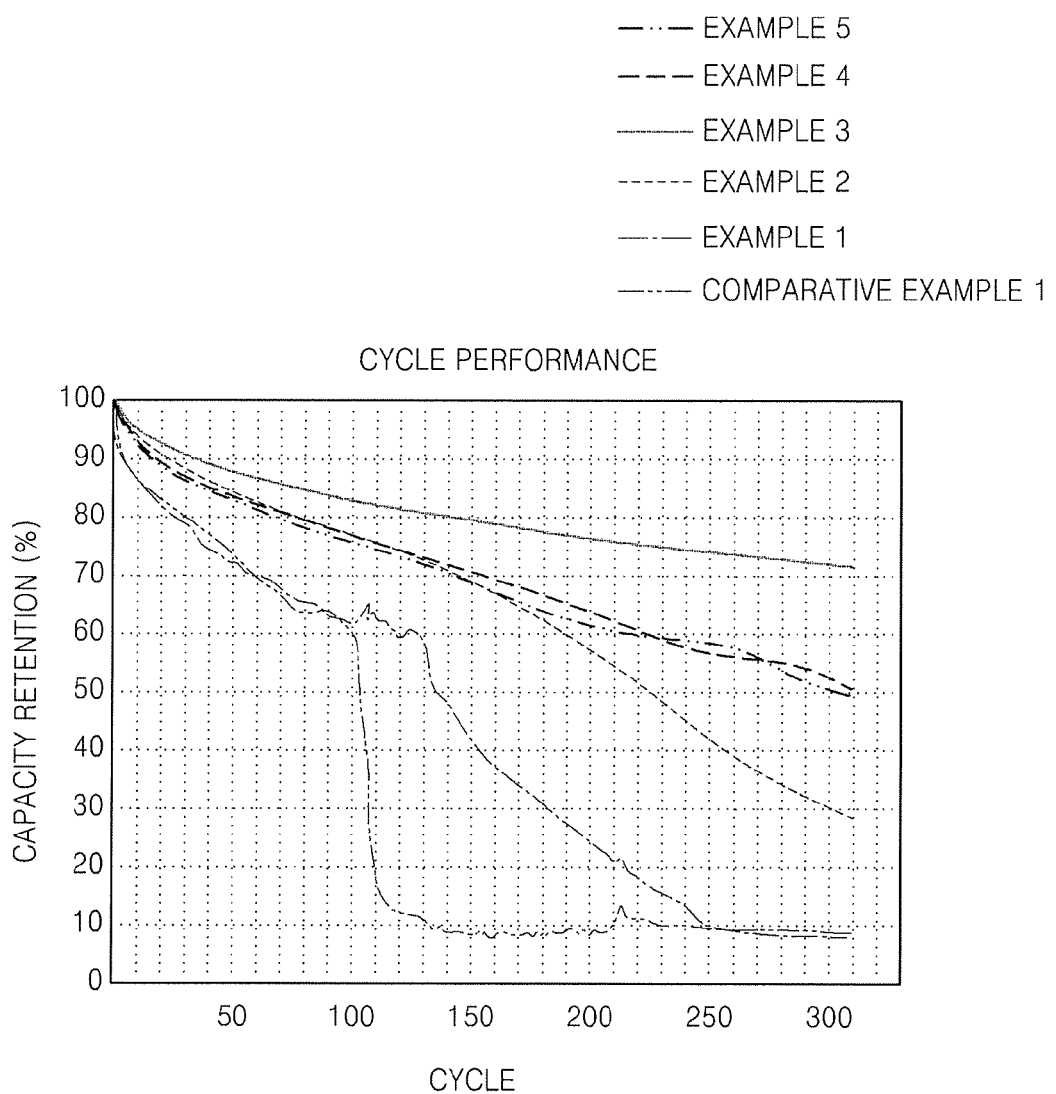
FIG. 2 is a graph showing measured capacitance retention ratios of lithium batteries manufactured according to Examples 1-5 and Comparative Example 1.

To identify lifespan characteristics according to an amount of the fluoride-based ether solvent, capacity retention ratios of the lithium batteries manufactured according to Examples 1-5 and Comparative Example 1 were measured, and results thereof are shown in FIG. 2.

As illustrated in FIG. 2, when the fluoride-based ether solvent is included in an amount of 3 vol % or more in the non-aqueous electrolytic solution, a capacity retention ratio of the battery increases. When the fluoride-based ether solvent is not included at all, withstanding voltage property decreases, and thus, at high voltages, an electrolytic solution is oxidized and a capacity retention ratio of the battery rapidly decreases. In addition, when the amount of the fluoride-based ether solvent is 10 vol % or more, lifespan characteristics are improved substantially, and at 30 vol %, lifespan characteristics are further improved.

Figure 3:
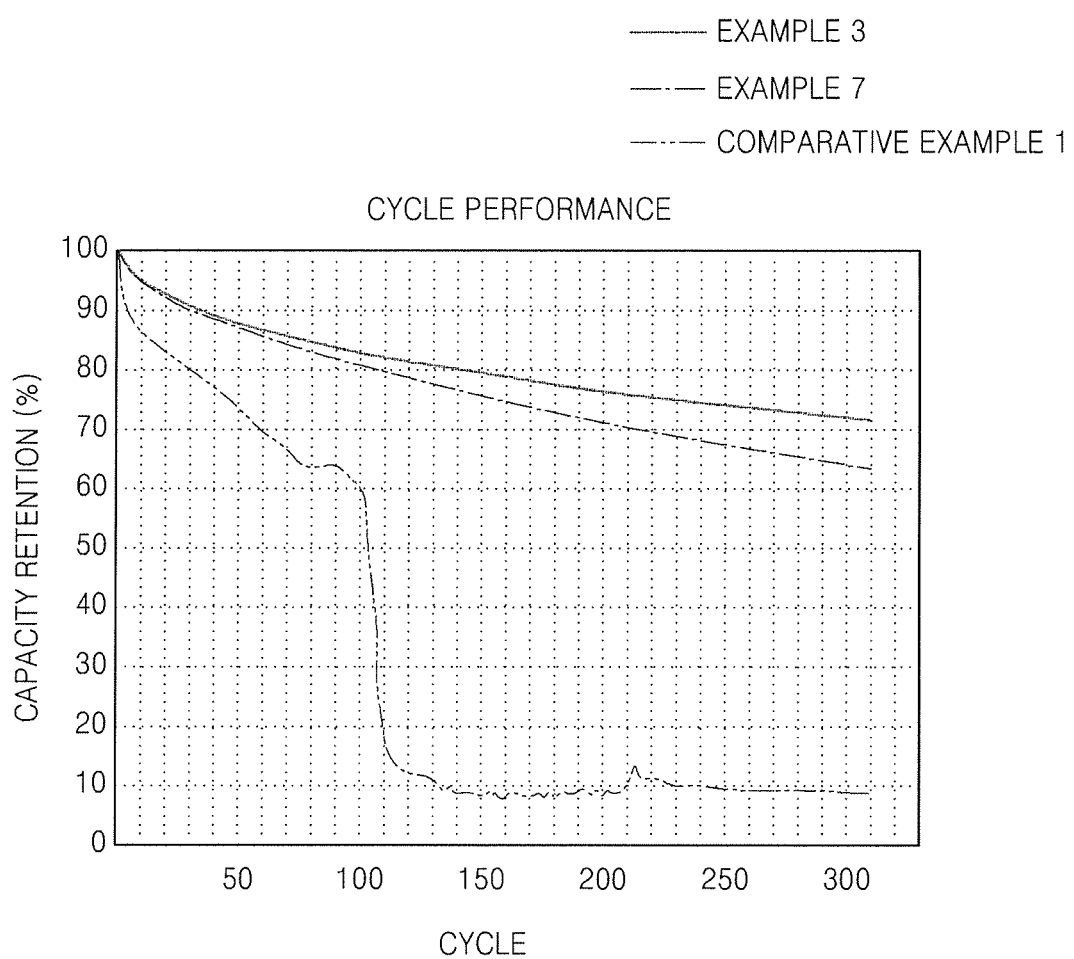
FIG. 3 is a graph showing measured capacitance retention ratios of lithium batteries manufactured according to Example 3, Example 7, and Comparative Example 1.

In addition, to identify lifespan characteristics according to an additive, capacity retention ratios of the lithium batteries manufactured according to Example 3, Example 7, and Comparative Example 1 were measured and results thereof are shown in FIG. 3.

As illustrated in FIG. 3, compared to Comparative Example 1 in which the fluorinated ether solvent and the tris trimethylsilyl phosphate additive were not used, a capacity retention ratio of Example 7 in which the fluoride-based ether solvent was used, was substantially improved. This shows that the use of the fluorinated ether solvent contributes to oxidation-resistance property stability at high voltages.

In addition, the capacity retention ratio of Example 3 in which tris trimethylsilyl phosphate was further added together with the fluoride-based ether solvent, was further improved. This may be because the tris trimethylsilyl phosphate additive may form a stable SEI film on a positive electrode to prevent leakage of metal ions from the positive electrode to increase a capacity retention ratio.

It should be understood that the exemplary embodiments described herein should be considered in a descriptive sense only and not for purposes of limitation. For example, the invention is not limited to the disclosed embodiments, but, on the contrary, is intended to cover various modifications and equivalent arrangements included within the spirit and scope of the appended claims, and equivalents thereof. Descriptions of features or aspects within each embodiment should typically be considered as available for other similar features or aspects in other embodiments.

What is claimed is:

1. A lithium battery comprising:
a positive electrode comprising an overlithiated transition metal oxide having a layered structure;
a negative electrode comprising a silicon-based negative active material; and
an electrolyte between the positive electrode and the negative electrode, the electrolyte comprising an electrolytic solution comprising a fluorinated ether solvent in an amount of 3 vol % or more based on the total volume of the electrolytic solution,
wherein the overlithiated transition metal oxide comprises a compound represented by Formula 1 below:

$xLi_2MO_3$-$(1-x)LiM'O_2$,  <Formula 1> wherein 0<x<1, M is at least one metal selected from Period 4 transition metals and Period 5 transition metals having a mean oxidation number of +4, and M' is at least one metal selected from Period 4 transition metals and Period 5 transition metals having a mean oxidation number of +3.

2. The lithium battery of claim 1, wherein the fluorinated ether solvent comprises at least one compound represented by Formulae 4 to 6 below:

Rf1—O—Rf2  <Formula 4>

Rf1—O—R  <Formula 5>

Rf1—O—(R'—O)$_n$—Rf2  <Formula 6> wherein Rf1 and Rf2 are each independently a linear or branched C1 to C12 fluoroalkyl group having at least one hydrogen atom substituted with a fluoro group, R is a linear or branched C1 to C12 alkyl group, R' is a linear or branched C1 to C5 alkylene group, and n is an integer of 1 to 5.

3. The lithium battery of claim 2, wherein Rf1 or Rf2 are each independently a fluoroalkyl group selected from the group consisting of $HCF_2$—, $CF_3$—, $HCF_2CF_2$—, $CH_3CF_2$—, $CF_3CH_2$—, $CF_3CF_2$—, $(CF_3)_2CH$—, $HCF_2CF_2CH_2$—, $CF_3CH_2CH_2$—, $HCF_2CF_2CF_2CH_2$—, $HCF_2CF_2CF_2CF_2CH_2$—, $CF_3CF_2CH_2$—, $CF_3CFHCF_2CH_2$—, $HCF_2CF(CF_3)CH_2$—, and $CF_3CF_2CH_2CH_2$—.

4. The lithium battery of claim 2, wherein R is an alkyl group selected from the group consisting of —$CH_3$, —$C_2H_5$, —$C_3H_7$, and —$CH(CH_3)CH_3$.

5. The lithium battery of claim 2, wherein R' is an alkylene group selected from the group consisting of —$CH_2$—, —$CH_2CH_2$—, and —$CH_2CH_2CH_2$—.

6. The lithium battery of claim 1, wherein the fluorinated ether solvent is selected from the group consisting of $HCF_2CF_2CH_2OCF_2CF_2H$, $HCF_2CF_2CH_2OCF_2CH_3$, $CF_3CF_2CH_2OCF_2CF_2H$, $CF_3CF_2CH_2OCF_2H$, $HCF_2CF_2OCH_2CF_3$, $HCF_2CF_2CH_2OCF_2CFHCF_3$, $CF_3CF_2CH_2OCF_2CFHCF_3$, $HCF_2CF_2CH_2OCH_2CFHCF_3$, $CF_3CF_2CH_2OCH_2CFHCF_3$, $HCF_2CF_2CH_2OCH_3$, and combinations thereof.

7. The lithium battery of claim 1, wherein the electrolytic solution comprises the fluorinated ether solvent in an amount of about 3 to about 70 vol % based on the total volume of the electrolytic solution.

8. The lithium battery of claim 1, wherein the electrolytic solution comprises the fluorinated ether solvent in an amount of about 10 vol % or more based on the total volume of the electrolytic solution.

9. The lithium battery of claim 1, wherein the electrolyte further comprises an additive selected from the group consisting of tris(trimethylsilyl) phosphate (TMSPa), lithium difluorooxalatoborate (LiFOB), vinylcarbonate (VC), propanesultone (PS), succinitrile (SN), $LiBF_4$, a silane compound, a silazane compound, and combinations thereof.

10. The lithium battery of claim 9, wherein each of the silane compound and the silazane compound has a functional group capable of forming of a siloxane bond.

11. The lithium battery of claim 10, wherein the functional group is selected from the group consisting of acryl, amino, epoxy, methoxy, and vinyl.

12. The lithium battery of claim 9, wherein the electrolytic solution comprises the additive in an amount in a range of about 0.01 to about 10 wt % based on the total weight of the electrolytic solution.

13. The lithium battery of claim 1, wherein the electrolytic solution further comprises a carbonate-based compound, an ester-based compound, an ether-based compound, a ketone-based compound, an alcohol-based compound, an aprotic solvent, or a combination thereof.

14. The lithium battery of claim 13, wherein the carbonate-based compound comprises a chain carbonate compound and a fluoro carbonate compound.

15. The lithium battery of claim 14, wherein the fluoro carbonate compound is present in an amount from about 1 to about 30 vol % based on the total volume of the electrolytic solution.

16. The lithium battery of claim 1, wherein the overlithiated transition metal oxide comprises at least one compound represented by Formulae 2 to 5 below:

$$x\text{Li}_2\text{MnO}_3\text{-}(1-x)\text{LiNi}_a\text{Co}_b\text{Mn}_c\text{O}_2, \quad \text{<Formula 2>}$$

wherein $0<x<1$, $0<a<1$, $0<b<1$, $0<c<1$, and $a+b+c=1$;

$$x\text{Li}_2\text{MO}_3\text{-}y\text{LiM'O}_2\text{-}z\text{Li}_{1+d}\text{Mn}_{2-d}\text{O}_4, \quad \text{<Formula 3>}$$

wherein $x+y+z=1$, $0<x<1$, $0<y<1$, $0<z<1$, and $0<d<0.33$, M is at least one metal selected from Period 4 transition metals and Period 5 transition metals having a mean oxidation number of +4, M' is at least one metal selected from Period 4 transition metals and Period 5 transition metals having a mean oxidation number of +3, and M" is at least one metal selected from Period 4 transition metals and Period 5 transition metals having a combined mean oxidation number of +3 or +4;

$$\text{Li}[\text{Li}_x\text{Me}_y]\text{O}_{2+d}, \quad \text{<Formula 4>}$$

wherein $x+y=1$, $0<x<1$, $0\leq d\leq 0.1$, and Me is at least one metal selected from the group consisting of Mn, V, Cr, Fe, Co, Ni, Zr, Re, Al, B, Ge, Ru, Sn, Ti, Nb, Mo, and Pt; and $$\text{Li}[\text{Li}_x\text{Ni}_a\text{Co}_b\text{Mn}_c]\text{O}_{2+d}, \quad \text{<Formula 5>}$$

wherein $x+a+b+c=1$, $0<x<1$, $0<a<1$, $0<b<1$, $0<c<1$, and $0\leq d\leq 0.1$.

17. The lithium battery of claim 1, wherein the silicon-based negative active material comprises a material selected from the group consisting of Si, $\text{SiO}_x$ ($0<x<2$), Si—Z alloy, and combinations thereof, wherein Z is alkali metal, alkali earth metal, a Group 11 element, a Group 12 element, a Group 13 element, a Group 14 element, a Group 15 element, a Group 16 element, a transition metal, a rare earth element, or a combination thereof, and is not Si.

18. The lithium battery of claim 1, wherein the silicon-based negative active material has a nano-structure having a dimension of at least one region thereof being less than about 500 nm.

19. The lithium battery of claim 18, wherein the nano-structure has a structure selected from the group consisting of nanoparticle, nanopowder, nanowire, nanorod, nanofiber, nanocrystal, nanodot, nanoribbon and combinations thereof.

\* \* \* \* \*